Oct. 12, 1965   J. G. WIATT   3,210,853
AUTOMATIC IN-PROCESS GAUGE
Filed Jan. 28, 1964   4 Sheets-Sheet 1

INVENTOR.
JAMES G. WIATT
BY
Howard O. Keiser
& Jack J. Earl
ATTORNEYS

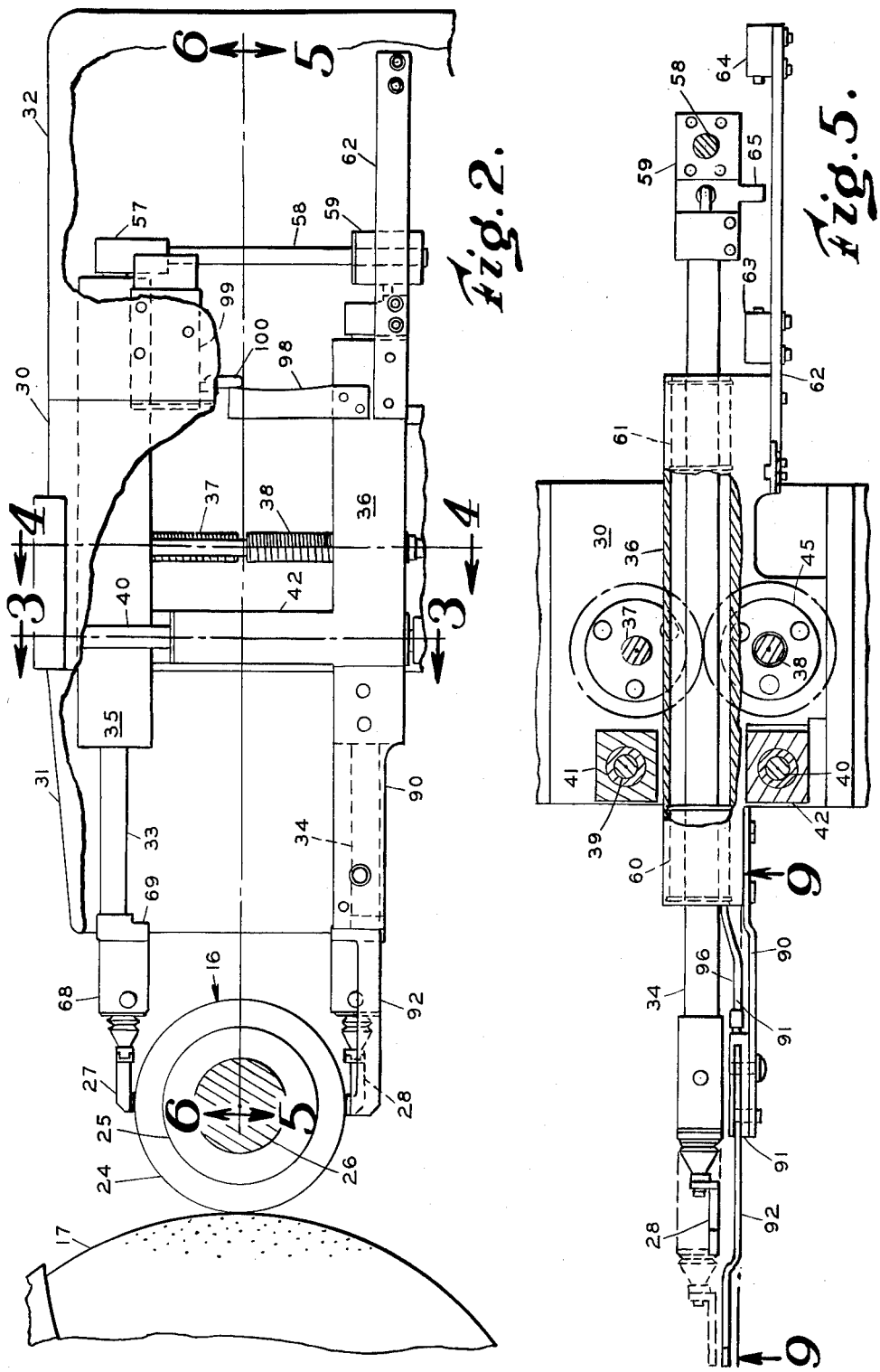

Oct. 12, 1965   J. G. WIATT   3,210,853
AUTOMATIC IN-PROCESS GAUGE
Filed Jan. 28, 1964   4 Sheets-Sheet 3
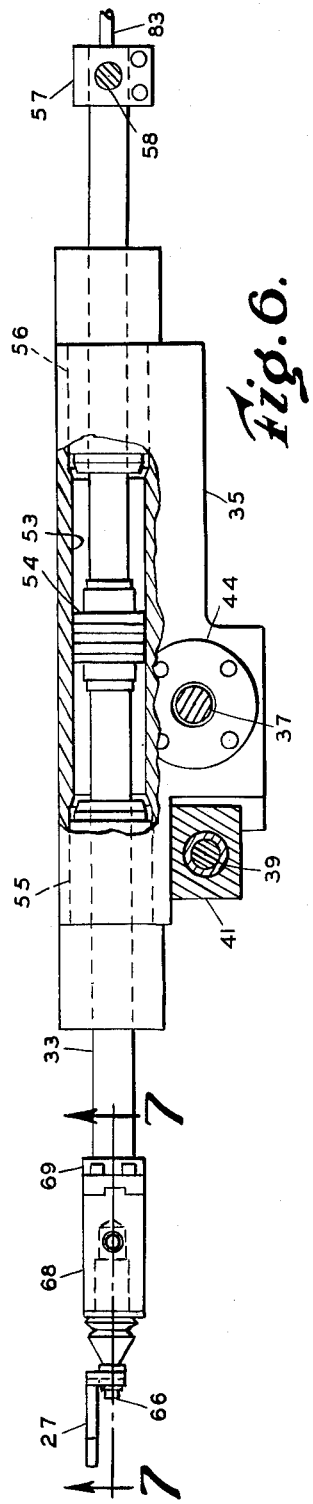
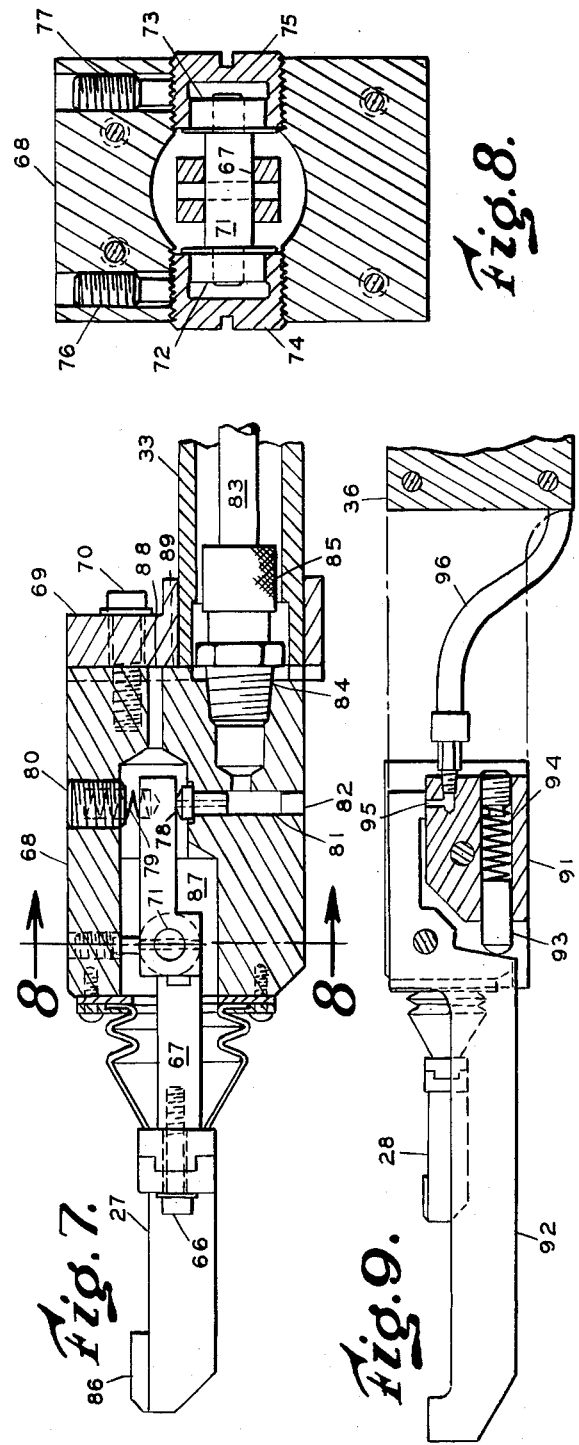

Oct. 12, 1965    J. G. WIATT    3,210,853
AUTOMATIC IN-PROCESS GAUGE
Filed Jan. 28, 1964    4 Sheets-Sheet 4

United States Patent Office 3,210,853
Patented Oct. 12, 1965

3,210,853
AUTOMATIC IN-PROCESS GAUGE
James G. Wiatt, Cincinnati, Ohio, assignor to The Cincinnati Milling Machine Co., Cincinnati, Ohio, a corporation of Ohio
Filed Jan. 28, 1964, Ser. No. 340,638
13 Claims. (Cl. 33—147)

This invention relates to a precision measuring device and more particularly to a gauge unit which is automatically adjustable in accordance with programmed settings to measure a plurality of different dimensions of a stepped cylindrical workpiece.

Precision measuring devices of the pneumatic-electric type as known and used in controlling precision grinding machines do not operate linearly over a wide range of sizes and therefore are not adapted for measuring a series of stepped diameters of a cylindrical workpiece without recalibration. Heavy workpieces such as the shafts of large electric motors of high horsepower often have several diameters of different sizes which are ground successively on one machine since the size and weight of the shaft make its unloading and reloading undesirable and since these shafts are often produced in small lots. Grinding operations of this type have not been successfully automated due in large part to the unavailability of a sensitive and accurate gauge which is automatically adjustable to measure a wide range of diameter sizes.

It is therefore an object of this invention to provide an accurate automatically adjustable gauge mechanism for measuring stepped diameters of a shaft.

It is a further object of this invention to provide a gauge which is adjustable to measure a predetermined series of dimensions in response to information stored in a permanent record.

Still another object of this invention is to provide a gauge mechanism that is automatically adjustable to measure any size between widely separated limiting extremes in response to a pre-recorded program of size settings.

It is also an object of this invention to provide a gauge mechanism in which a pair of calipers may be moved accurately and automatically for measurement of different sizes of a workpiece and which is immediately resettable for a succeeding cycle of different settings without the introduction of errors in relative size measurements.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the preferred form, this invention is in the form of a jump-on gauge having a pair of calipers adapted to move out from a housing to span and measure a workpiece. The calipers move back into the housing during the interval between two measuring operations. The calipers are both movable toward and away from a plane passing centrally therebetween for adjustment to correspond to the dimension which is to be measured. The movement of both calipers is accomplished simultaneously by the operation of a motor connected to move the calipers in opposite directions in response to the difference between a signal proportional to the instantaneous gauge size setting and a signal proportional to a desired size setting. The desired size signal is provided from information that is stored in a permanent record such as a punched tape and which is rendered operative selectively. An interconnected mechanical drive is provided from the motor to the calipers and to a position analog unit which keeps track of the instantaneous relative caliper position and provides the signal by which the adjusting motor is operated. Since mechanical systems contain inaccuracies which occur repeatedly in cyclic operation, an error correction signal generator is also connected to the calipers to add a corrective factor such that the calipers can be set very accurately at any relative position between their extreme size positions.

A clear understanding of the construction of the invention in its preferred form and its operation can be obtained from the following detailed description in which reference is made to the attached drawings wherein:

FIG. 2 is a side elevation of the gauging unit with the cover broken away to reveal the mechanism inside.

FIGS. 5 and 6 are longitudinal sections of the gauge of FIG. 2 on opposite sides of the line 5—5, 6—6.

FIG. 7 is an enlarged longitudinal section of a gauge caliper.

FIG. 8 is a section of the caliper of FIG. 7 on the line 8—8.

FIG. 9 is an enlarged side view of a portion of FIG. 5 as viewed from line 9—9.

Figure 1:
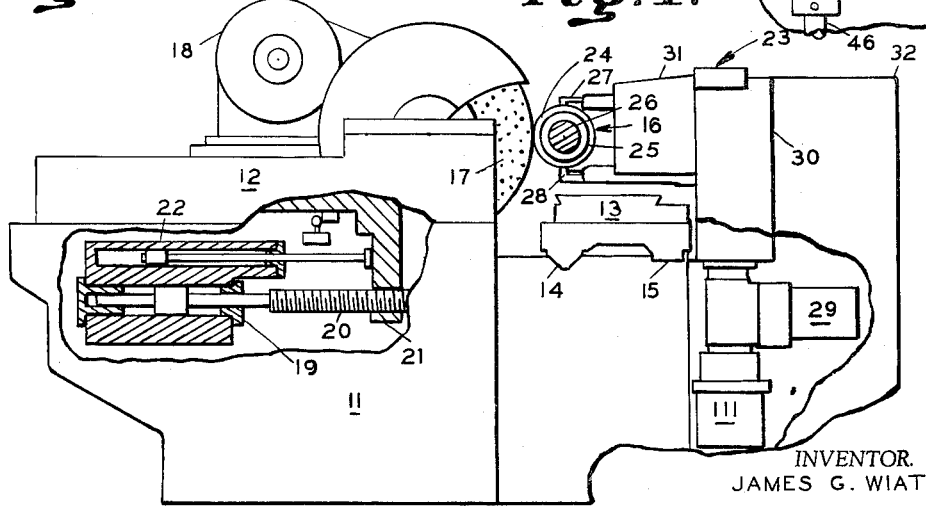
FIG. 1 is a side elevation of a grinding machine with part of the wheelhead drive mechanism shown in section.

The grinding machine of FIG. 1 is comprised of a bed 11 on which a wheelhead 12 is slidably movable toward and away from a table 13 that is longitudinally movable along ways 14, 15 on the bed 11. Head and tail stocks (not shown) of conventional form are attached to the table 13 to rotatable support a workpiece 16 which is moved transversely across the peripheral face of a grinding wheel 17 that is carried by the wheelhead 12 and rotated by a motor 18. The wheelhead 12 is moved toward and away from the table 13 by the operation of a piston and cylinder rapid advance motor 19 and by the rotation of a screw 20 connected to the rapid advance motor 19 and engaged through a nut 21 depending from the wheelhead 12. An anti-backlash motor 22 applies a constant bias force to the wheelhead 12 such that the screw 20 and nut 21 do not cross over to change the thread flanks at which they are in firm contact. An automatic gauge unit 23 is mounted on the front of the bed 11 for in process measurement of the workpiece 16 as it is ground. As can be seen the workpiece 16 has a plurality of cylindrical diameters 24, 25 and 26, all of which are to be ground without removal of the workpiece 16 from the machine. The actual measurement of the workpiece 16 is performed by the diametrical spanning of it by a pair of calipers 27, 28 extending from the gauge unit 23 and which will be described in detail subsequently herein. The calipers 27, 28 are relatively positionable to change the span therebetween through operation of a motor 29 connected thereto.

Figure 3:
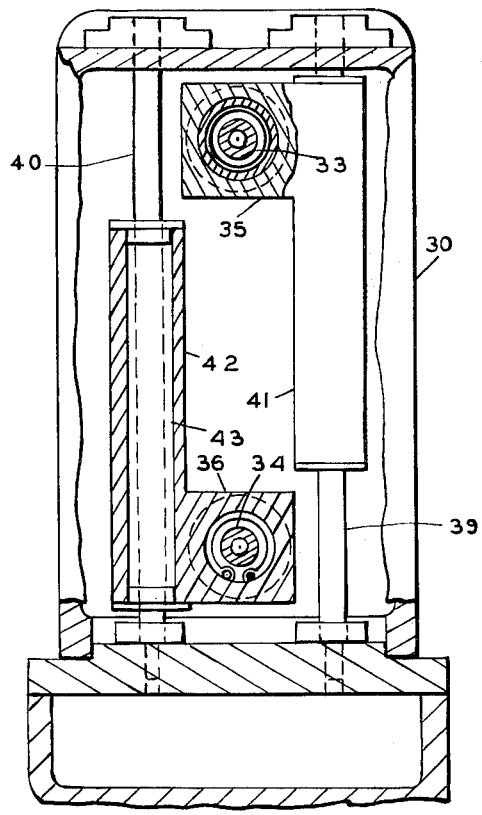
FIG. 3 is a section view of the gauge taken on line 3—3 of FIG. 2.
Figure 4:
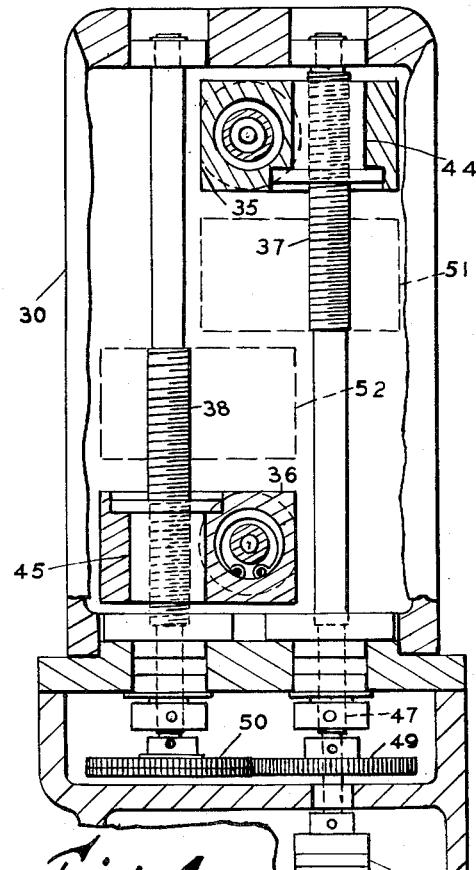
FIG. 4 is a section of FIG. 2 as viewed on the line 4—4 therein.

The mechanism by which the calipers 27, 28 are supported and relatively moved is shown in detail in FIGS. 2, 3 and 4. The gauging unit is supported in a housing 30 to which front and rear covers 31, 32, fabricated of sheet metal, are attached to enclose the mechanism that extends from the housing 30. The calipers 27, 28 are attached to rods 33, 34 which extend from a pair of carriages 35, 36 in the housing 30. The carriages 35, 36 are supported in the housing 30 by one of a pair of parallel screws 37, 38, respectively, which are parallelly held therein and rotatable on vertical axes. A pair of guide rails 39, 40 are fixed in the housing 30 forward from the screws 37, 38, respectively, and each of these guide rails passes through one of the carriages 35, 36 and a guide extension 41, 42 integral therewith. In the preferred form, each of the guide extensions 41, 42 encloses a ball bearing bushing 43 (not shown in detail) which is freely movable axially along the guide rail 39, 40 over which it is received. These bushings 43 are preloaded so that there is no play or looseness between the guide rails 39, 40 and the carriages 35, 36. The screws 37, 38 are also preferably ball bearing screws and each of the fixed nuts 44, 45 in the carriages 35, 36, respectively, are of the recirculating ball bearing type so that the carriages are freely movable relative to the screws. These ball bearing nuts 44, 45 are also preloaded in the preferred form to provide rigidity and freedom from blacklash in the mechanism. The combined effect of the screws 37, 38 and guide rails 39, 40 passing through the carriages 35, 36 is to render these carriages 35, 36 relatively movable in the housing 30 while maintaining them in vertical alignment with a constant angular relation to the direction in which they are relatively movable.

The screws 37, 38 are of the same lead and hand but are counter-rotated to move the carriages 35, 36 simultaneously so that they move toward and away from one another and in opposite directions relative to a plane passing centrally between them, the plane remaining always at the same location and including the axis on which the workpiece 16 is rotated. (The plane passing centrally between the carriages 35, 36, and also the calipers 27, 28 is the plane from which the mechanism is viewed in section in FIGS. 5 and 6.) The drive linkage between the screws 37, 38 and the motor 29 is shown best in FIG. 4. An output shaft 46 is rotated by the motor 29 and torque from the shaft 46 to the lower end of the shaft portion 47 of the screw 37 is applied through a coupling 48. A gear 49 is fixed on the shaft portion 47 and is rotated therewith. A mating gear 50 is received on the end of the screw 38 and is in mesh with the gear 49. Both of the gears 49, 50 have the same number of teeth and hence there is a one to one transmission ratio between them. The two gears 49, 50 will be counter-rotating and thus the two screws 37, 38 will be counter-rotating when driven by the motor 29. The gear 50 is a split gear having upper and lower halves relatively rotatable and biased to tend to counter rotate in a well known manner such that the teeth of the gear 50 engage on both flanks of the teeth of the gear 49 to eliminate backlash therebetween. As shown in FIG. 4, the carriages 35, 36 are moved apart to their fullest extent for measurement of the largest diameter 24 while the phantom positions 51, 52 indicate the positions of the carriage 35, 36, respectively, when they are closed together for measurement of the smallest diameter 26.

As shown in FIG. 2, the calipers 27, 28 are mounted on the ends of a pair of rods 33, 34 which extend through the carriages 35, 36. The rods 33, 34 are reciprocally movable to advance and retract the calipers from the carriages 35, 36, the advanced position of the calipers being shown in FIG. 2 wherein the calipers 35, 36 are shown diametrically spanning the large diameter 24. The carriage 35 contains the mechanism by which the advancement and retraction of the calipers 27, 28 is powered and the mechanism is shown in FIG. 6. The rod 33 extends completely through the carriage 35 and is reciprocated therein by the selective introduction of air under pressure to a cylinder 53 formed therein on one side or the other of a piston 54 fixed on the rod 33. The rod 33 is held in ball bearing bushings 55, 56 (not shown in detail) fixed at each end of the carriage 35 and these bushings preferably are preloaded also to hold the rod 33 firmly on a constant longitudinal axis in the carriage 35. The rear end of the rod 33 carries a bracket member 57 from which a connecting rod 58 extends to a bracket 59, FIG. 5, fixed on the rear end of the other rod 34 that is received through the carriage 36. The rod 58 is fixed in the bracket 57 but is axially movable through the bracket 59 which contains a ball bearing bushing (not shown) that permits relatively free movement of the rod 58 therethrough. The connecting rod 58 carries the rod 34 in reciprocation through the carriage 36 in unison with the rod 33 as it is moved through the carriage 35. The rod 34 is received in ball bearing bushings 60, 61 fixed in the carriage 36 and similar to those through which the rod 33 is received in the carriage 35. As shown in FIGS. 2 and 5, a bracket 62 is fixed to the side of the carriage 36 and extends rearwardly therefrom. A pair of limit switch mechanisms 63, 64 are fixed thereon and are adapted for operation by a dog 65 extending laterally from the bracket 59 when the rods 33, 34 are in the advanced and retracted positions thereof respectively. These limit switches produce signals which are used in the circuits which control the operating cycle of the grinding machine described.

The calipers 27, 28 are adapted to contact a diameter of the workpiece 16 when the rods 33, 34 are extended from their carriages 35, 36. The calipers 27, 28 are parts of a pneumatic gauging system by which the discharge of air under pressure is controlled to produce a back pressure condition in a pneumatic supply line to indicate relative size. The detail of a caliper mounting and its control effect on air pressure is shown in FIGS. 7 and 8. The calipers 27 is shown in FIG. 7 to be fixed by machine screws 66 on the end of a lever 67 which is pivotally mounted in a head member 68 that is fixed on the outer end of the rod 33 by means of a bracket 69 and screws 70. As shown in FIG. 8, the lever 67 is fixed on an axle 71 that is freely rotatable in bearings 72, 73 which are retained in the head 68 by threaded caps 74, 75 held fixedly in the head by dog point set screws 76, 77. The rear end of the lever 67 is held against an orifice member 78 by a spring 79 mounted in the head 68 by a screw 80. The orifice member 78 is fixed in the inner end of an air passage 81, sealed at its outer end by a plug 82. The passage 81 is supplied with air under pressure from a conduit 83 that extends through the rod 33, which is hollow, the conduit 83 being connected at the head 68 by a pipe nipple 84 and coupling 85.

A small hard anvil 86 is fixed on the caliper 27 and it is adapted to contact the workpiece 16. This forces the lever to swing against the bias of the spring 79 to open the orifice 78 to allow air to discharge therefrom into the cavity 87 which is vented back into the hollow rod 33 through passages 88, 89 and the air is allowed to escape freely from the rear end of the rod 33. The back pressure in the conduit 83 is then reduced. As the size of the workpiece 16 is reduced, the lever 67 is swung back to progressively restrict the flow of air from the orifice 78 and the pressure in the conduit 83 progressively rises. The other caliper 28 is mounted in the same manner as the caliper 27 and controls the discharge of air from an orifice in the same way. The air supply to this other orifice is connected to the same supply line from which the conduit 83 extends. The back pressure in this common supply line is controlled by the combined effect of the movement of both calipers 27, 28 and pneumatic relays are operated to control the grinding cycle of the machine as the diameter of the workpiece 16 being operated upon and simultaneously measured reaches a predetermined size. A predetermined back pressure in the air supply line will indicate this. An example of a pneumatic relay of the type proposed herein is shown and the operation thereof described in U.S. Patent 3,037,332 issued June 5, 1962 on an application filed by J. G. Wiatt and G. S. Butterworth. The predetermined sizes of each of the diameters 24, 25, 26 will result in the same predetermined back pressure while the carriages 35, 36 are shifted to each corresponding position to hold the calipers 27, 28 to span and measure the appropriate diameter.

The lower caliper 28 is mounted adjacent to a safety device which prevents the calipers from being forced over a diameter too large for measurement by any particular positioning of the carriages 35, 36. The safety device is shown in FIGS. 5 and 9. The carriage 36 has a bracket 90 which extends outward therefrom parallel to the rod 34 and the caliper 28. A member 91 is attached to the bracket and a lever 92 is pivotally mounted therein. A plunger 93 is slidably received in the member 91 and as urged outward against the lever 92 by a spring 94. Thus the lever 92 tends to rotate clockwise as viewed in FIG. 9 and an orifice 95 is closed by the rear end of the lever 92. The orifice 95 is supplied with air under pressure by a tube 96 that is ultimately connected with a pneumatic relay 97, see FIG. 10, which provides a signal whenever the lever 92 is swung to release air from the orifice 95 and thus allows the pressure in the tubing 96 to be reduced. The lever 92 extends outward to the centerline of the workpiece 16 and will engage the workpiece 16 whenever the carriages 35, 36 are positioned to measure a diameter smaller than the diameter in line with the gauge unit. The signal from the pneumatic relay 97 is used to prevent the operation of the piston 54 and cylinder 53 to extend the calipers 27, 28 against the workpiece 16. It should be pointed out that while the workpiece 16 is being positioned prior to the application of the calipers to it, the gauge carriages 35, 36 are spread to their maximum span and when the workpiece is positioned, the carriages are closed together to the appropriate positions. Thus the lever 92 will not interfere with the movement of the workpiece 16 which may be accomplished by a positioning mechanism such as the type shown in U.S. Patent 3,056,240 issued October 2, 1962 on an application filed by John M. Morgan Jr. and Robert G. Wise. The described operation also results in the positioning of the carriages 35, 36 from the same direction at all times which adds to the accuracy of the system by insuring that any backlash in the system is always at the same condition when a measurement is made.

The gauge unit also contains a mechanism shown in FIG. 2 by which a signal is produced to correct for repeatable errors in the carriage drive system arising from such things as errors in the screws 37, 38 and gears 49, 50. This mechanism includes a cam 98 fixed to the lower carriage 36 and extending upward toward the other carriage 35. The carriage 35 carries a differential transformer 99 from which a cam follower 100 extends to engage the cam 98. Thus as the carriages 35, 36 are relatively moved, the follower 100 moves along the cam 98 and the transformer 99 produces an electrical output varying with the shape of the cam 98 and relative position of the carriages 35, 36. The cam is shaped in accordance with the repeatable errors in the system and produces a correction signal from the transformer 99 to correct the positioning of the carriages 35, 36 to account for these errors.

Figure 10:
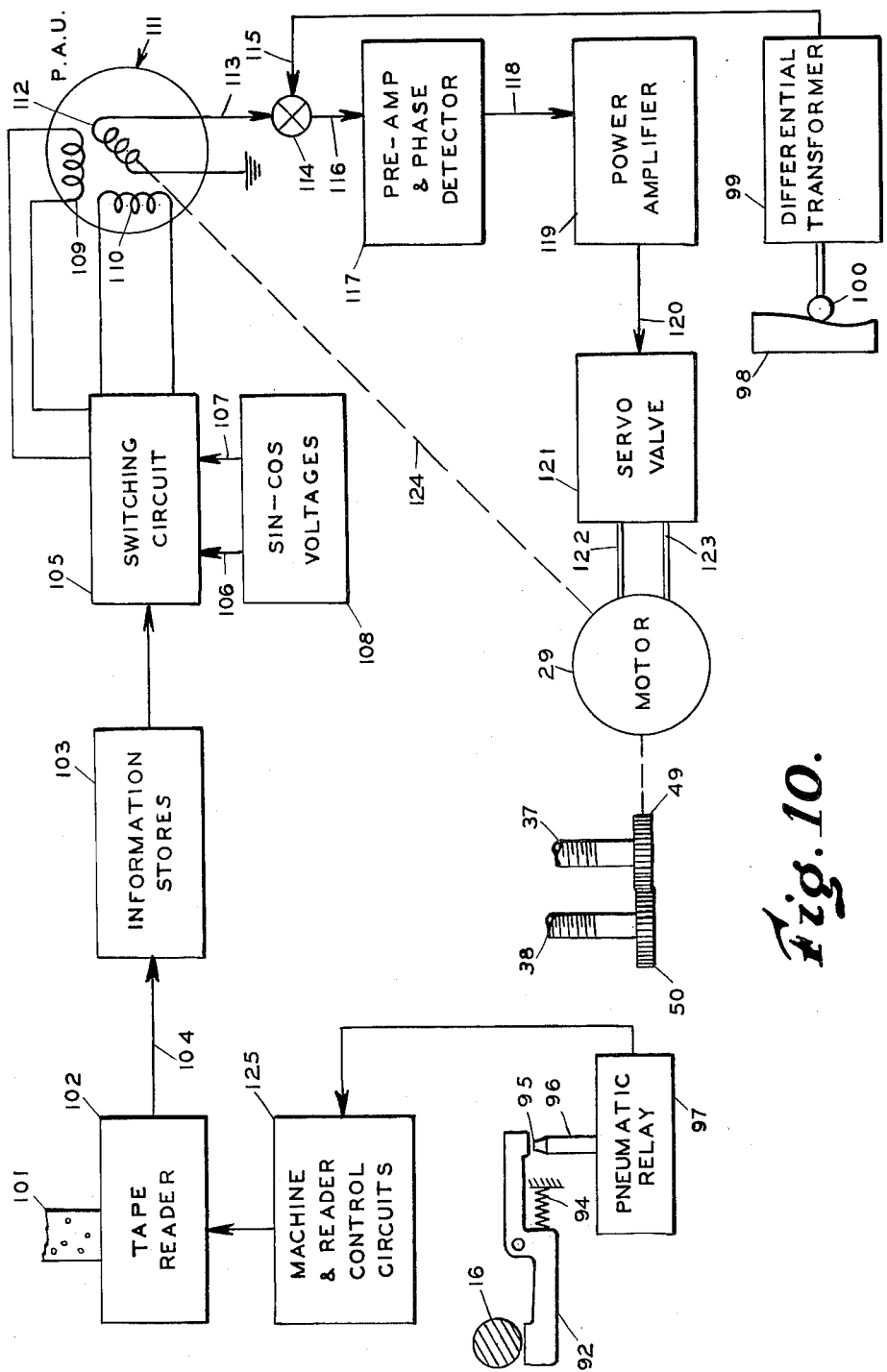
FIG. 10 is a schematic block diagram of the gauge, its control circuit and the mechanical drive for adjusting the measurable size.

The control circuit for the gauge positioning is shown in schematic block form in FIG. 10 the actual electrical control circuits of the blocks being of any type known in the art which will produce the desired results, there being many such devices in current use in point to point positioning systems. Gauge size setting information is stored in a permanent record which in the described system is a punched tape 101. Portions of the tape 101 are scanned periodically by a reader mechanism 102 which produces electrical signals representative of the information on the tape 101 and these signals are conveyed to an information storage circuit 103 by a cable 104. The storage circuit 103 operates a switching circuit 105 to which sine and cosine voltages are supplied by cables 106, 107 from a generator 108. The switching circuit 105 being set in accordance with information in the stores 103 connects predetermined sine and cosine alternating current voltages, respectively, to a pair of quadrature windings 109, 110 in a position analog unit 111 to define a unique position at which a rotor winding 112 will produce a null voltage output on a conductor 113 connected thereto. As shown, the position analog unit 111 is a single resolver but in practice the device might be a multispeed resolver system or any other transformer device having relatively movable elements, one of which will produce a null signal when in a predetermined position defined by selected voltage applied to the other of the elements thereof. The output of the rotor 112 is coupled to an adding circuit 114 to which a signal is also coupled by a conductor 115 from the differential transformer 99 that produces the error compensation signal. The signal representing the sum of the signals on the two conductors 113, 115 is coupled through a conductor 116 to a preamplifier and phase detector circuit 117. This circuit produces a direct current output on a conductor 118 having an amplitude and sign in accordance with the distance and direction of the rotor winding 112 from its null position, the null being modified slightly by the signal from the transformer 99. The signal from the circuit 117 is coupled through the conductor 118 to a power amplifier 119 where it is amplified and directed through a cable 120 to a servo valve 121. The valve 121 reacts to direct fluid through the pipes 122, 123 to and from the motor 29. The motor 29 is linked by a mechanical connection 124 to rotate the rotor 112. The circuits described and servo valve 121 cause operation of the motor 29 in a direction to rotate the rotor 112 toward its null position to reduce the signal output therefrom. The motor 29 rotates the gears 49, 50 simultaneously with the rotor 112 and the null position to which the rotor 112 is driven corresponds to the predetermined relative position of the carriages 35, 36 for measurement of a selected span or workpiece diameter as called for by the information on the tape 101. Additional circuits 125 are included in the system to coordinate the grinding cycle of the machine with the setting of the gauge unit and the safety signal from the relay 97 is connected into these circuits for stopping the machine if an improper diameter is placed in alignment with the gauge unit. Reader and machine cycle control circuits are known for various grinding cycles and an example of such a circuit which is adaptable to operate with this invention is described in detail in the above cited U.S. Patent 3,056,240.

While this invention has been described in connection with one possible form or embodiment therefo, it is to be understood that the present disclosure is illustrative rather than restrictive and that changes and modifications may be resorted to without departing from the spirit of the invention or the scope of the claims which folow.

What is claimed is:

1. A gauging unit automatically adjustable over a range of sizes to measure an object sized within the range comprising in combination:
   (a) a housing,
   (b) a pair of calipers received in said housing and operable to measure the object when the object is embraced therebetween, said calipers movable in said housing toward and away from one another,
   (c) a motor connected to said pair of calipers and operable when energized to move said calipers relatively,
   (d) means to indicate the instantaneous relative position of said calipers,
   (e) means to produce a signal representative of a predetermined measurable size, and
   (f) control means responsive to said position indicating means and predetermined size signal to energize said motor to adjust said calipers for measurement of said predetermined size.

2. The gauge unit of claim 1 wherein:

(a) said calipers are movable in and out of said housing, (b) means are provided for moving said calipers selectively in and out of said housing, said calipers adapted for spanning and measuring said object when extended out from said housing, and (c) safety means are mounted adjacent to one of said calipers for movement therewith relative to said other caliper for engaging the object when the size thereof is in excess of said predetermined size by a preset amount, said safety means adapted to produce a signal to prevent extension of said calipers from said housing when the object is engaged thereby.

3. The gauge unit of claim 2 wherein said safety means includes:

(a) a pivotal probe adapted to engage the object, (b) a pneumatic orifice, and (c) bias means normally to hold said probe against said orifice for closure thereof, said bias means yielding when the object is engaged by said probe to open said orifice and thereby produce a pneumatic signal.

4. A gauging unit automatically adjustable to measure a selected size within a range of sizes comprising in combination:

(a) a housing, (b) a pair of calipers received in said housing and operable to measure a span embraced therebetween, said calipers movable in the housing toward and away from one another, (c) a motor connected to said pair of calipers and operable when energized to move said calipers relatively for adjustment of the span embraced therebetween, (d) a position analog unit operable to indicate electrically the instantaneous relative position of said calipers, (e) means to produce an electric signal representative of a predetermined size, and (f) a control circuit responsive to said position analog unit and said electrical signal to energize said motor to adjust said calipers for measurement of said predetermined size.

5. The gauging unit of claim 4 wherein:

(a) a mechanical linkage connects said motor and said calipers for relative movement when said motor is energized, said linkage and position analog unit having inaccuracies therein producing repeatable errors in relative movement of said calipers, (b) correction means are included to produce a repeatable error compensating signal, and (c) said control circuit is also responsive to said error compensating signal to correct the adjustment of said calipers for the repeatable errors.

6. The gauging unit of claim 5 wherein said correction means includes:

(a) a cam fixed to said housing and having a contour shaped in accordance with the repeatable error in said linkage, (b) a cam follower connected to one of said calipers for movement therewith relative to the other caliper by said motor and adapted continuously to contact said cam contour, and (c) means responsive to movement of said cam follower by said cam contour when said one caliper is moved to produce an electrical error compensating signal.

7. A gauging unit automatically adjustable over a range of sizes to measure an object sized within the range of sizes comprising in combination:

(a) a housing, (b) a pair of calipers received in said housing and operable to measure the object embraced therebetween, each caliper of said pair being movable in said housing toward and away from a reference plane passing centrally therebetween, (c) a reversibly operable motor attached to said housing, (d) a mechanical linkage between said motor and said pair of calipers and operable when said motor is energized to move each caliper of said pair an equal distance relative to said reference plane and in a direction relative to one another depending upon the direction of operation of said motor, (e) a position analog unit driven by said motor simultaneously with movement of said calipers and operable to indicate electrically the instantaneous positions of said calipers relative to said reference plane.

(f) means selectively to produce a series of electrical signals representative of predetermined span sizes and including (1) a permanent record on which information is maintained representative of said series of signals, and (g) a control circuit responsive to said position analog unit and to each signal of said series of signals to energize said motor and adjust said calipers for measurement of said predetermined sizes.

8. The gauging unit of claim 7 wherein:

(a) said calipers are selectively movable together in and out of said housing in a direction transverse to the direction of relative movement by said motor and are adapted when extended out therefrom to span and measure said object, and (b) safety means are mounted adjacent to one of said calipers and are movable therewith by operation of said motor, said safety means being adapted to engage the object when the size thereof is in excess of said predetermined size by a preset amount and to produce a signal to prevent extension of said calipers from said housing when the object is engaged thereby.

9. The gauging unit of claim 7 wherein:

(a) said mechanical linkage and position analog unit have inaccuracies therein producing repeatable errors in movement of said calipers by said motor relative to said electrical span size signals, (b) means are included to produce an error compensating signal in accordance with said repeatable errors, and (c) said control circuit is also responsive to said error compensating signal to correct the adjustment of said caliper for the repeatable errors.

10. The gauging unit of claim 7 wherein said mechanical linkage includes:

(a) a pair of screws rotatably received in said housing and oriented in the direction of movement of said calipers relative to one another, (b) a pair of nuts, one and the other of said nuts respectively connected to one and the other of said calipers and engaged with one and the other of said screws, and (c) gearing connected between said screws for rotating one of said screws at the same rate but in the opposite direction as the other of said screws when the other screw is rotated, said other screw being connected directly to said motor for rotation thereby.

11. The gauging unit of claim 10 wherein:

(a) guide rails are included in said housing parallel to said screws, (b) anti-friction means are attached to said calipers and engaged to move along said guide rails when said calipers are relatively moved, said guide rail and screws cooperating to maintain a predetermined alignment of said calipers relative to said screws, and (c) said screws and nuts engaged thereby include anti-friction bearing means received therebetween whereby said calipers are freely movable when said motor is energized.

12. A gauging unit for measuring an object comprising in combination:

(a) a pair of calipers adapted to measure the object when spanned thereacross, said caliper relatively movable in one coordinate direction and movable in unison in another coordinate direction,
(b) a motor connected to said calipers and operable when energized to move said calipers in said one coordinate direction to adjust the spacing therebetween,
(c) means to produce a size adjustment signal,
(d) means responsive to said size adjustment signal to energize said motor for movement of said calipers to a corresponding predetermined relative spacing, and
(e) means to shift said calipers in said other coordinate direction to span the object for measurement thereof.

13. The gauging unit of claim 4 wherein said means to produce a size adjustment signal includes:
(a) a permanent information storage medium having representations thereon of a series of said size adjustment signals, and
(b) means to convert said representation to said respective size adjustment signals to effect a plurality of adjustments of the relative spacing of said calipers.

No references cited.

ISAAC LISANN, *Primary Examiner.*